United States Patent
Sokolov et al.

(10) Patent No.: US 10,812,981 B1
(45) Date of Patent: Oct. 20, 2020

(54) SYSTEMS AND METHODS FOR CERTIFYING GEOLOCATION COORDINATES OF COMPUTING DEVICES

(71) Applicant: Symantec Corporation, Mountain View, CA (US)

(72) Inventors: Ilya Sokolov, Boston, MA (US); Keith Newstadt, Newton, MA (US)

(73) Assignee: NortonLifeLock, Inc., Tempe, AZ (US)

( * ) Notice: Subject to any disclaimer, the term of this patent is extended or adjusted under 35 U.S.C. 154(b) by 40 days.

(21) Appl. No.: 15/466,156

(22) Filed: Mar. 22, 2017

(51) Int. Cl.
| | |
|---|---|
| G08B 23/00 | (2006.01) |
| H04W 12/12 | (2009.01) |
| H04W 4/02 | (2018.01) |
| H04L 29/06 | (2006.01) |
| H04B 10/116 | (2013.01) |

(52) U.S. Cl.
CPC ......... H04W 12/12 (2013.01); H04L 63/1466 (2013.01); H04W 4/025 (2013.01); H04B 10/116 (2013.01)

(58) Field of Classification Search
CPC ..... G06F 2221/2111; G06F 2221/0708; H04L 63/1483; H04L 9/0872
USPC ........................................................ 726/22
See application file for complete search history.

(56) References Cited

U.S. PATENT DOCUMENTS

| | | | |
|---|---|---|---|
| 3,740,718 A | 6/1973 | Melvin, Jr. | |
| 3,744,043 A | 7/1973 | Walden et al. | |
| 5,867,578 A | 2/1999 | Brickell et al. | |
| 6,100,811 A | 8/2000 | Hsu | |
| 6,903,683 B1 | 6/2005 | Nicholson | |

(Continued)

FOREIGN PATENT DOCUMENTS

| | | |
|---|---|---|
| AU | 2013371346 B2 | 3/2017 |
| CA | 2 895 265 C | 2/2018 |

(Continued)

OTHER PUBLICATIONS

Reed et al, Ensuring Operational Privacy of Primary Users in Geolocation Database-Driven Spectrum Sharing, Bradley Department of Electrical and Computer Engineering, Virginia Tech, Jun. 30, 2013, pp. 1-63.*

(Continued)

*Primary Examiner* — Alexander Lagor
*Assistant Examiner* — Jenise E Jackson
(74) *Attorney, Agent, or Firm* — FisherBroyles, LLP

(57) ABSTRACT

The disclosed computer-implemented method for certifying geolocation coordinates of computing devices may include (i) receiving, from a client computing device, a set of geolocation coordinates that purport to identify the physical location of the client computing device, (ii) identifying, in response to receiving the geolocation coordinates, at least one cooperating geolocation device that is within physical proximity to the geolocation coordinates provided by the client computing device, (iii) performing a proximity validation check that demonstrates that the client computing device is within physical proximity to the cooperating geolocation device, and (iv) certifying, based on the proximity validation check, the geolocation coordinates as valid geolocation coordinates. Various other methods, systems, and computer-readable media are also disclosed.

20 Claims, 7 Drawing Sheets

(56) References Cited

U.S. PATENT DOCUMENTS

| | | |
|---|---|---|
| 6,970,183 B1 | 11/2005 | Monroe |
| 7,657,097 B2 * | 2/2010 | Silic ................. G09G 3/00 |
| | | 257/88 |
| 7,925,751 B1 | 4/2011 | Bolinger et al. |
| 8,261,976 B1 | 9/2012 | Block et al. |
| 8,316,421 B2 | 11/2012 | Etchegoyen |
| 8,620,841 B1 | 12/2013 | Filson |
| 8,719,590 B1 | 5/2014 | Faibish et al. |
| 8,726,405 B1 | 5/2014 | Bailey |
| 8,925,037 B2 | 12/2014 | Marino et al. |
| 9,154,466 B2 | 10/2015 | Sobel et al. |
| 9,171,178 B1 | 10/2015 | Banerjee |
| 9,202,173 B1 | 12/2015 | Dotan et al. |
| 9,218,468 B1 | 12/2015 | Rappaport |
| 9,282,435 B2 | 3/2016 | Ward et al. |
| 9,396,599 B1 | 7/2016 | Malhotra |
| 9,479,250 B2 * | 10/2016 | Mitchell ............ H04B 10/116 |
| 9,661,483 B2 | 5/2017 | Bastianelli |
| 9,697,660 B1 | 7/2017 | Sokolov et al. |
| 9,817,958 B1 | 11/2017 | McCorkendale |
| 9,954,680 B1 | 4/2018 | Machani et al. |
| 10,116,513 B1 | 10/2018 | Sundaram |
| 10,326,733 B2 | 6/2019 | Bokare et al. |
| 10,375,114 B1 | 8/2019 | Gu et al. |
| 2002/0059532 A1 | 5/2002 | Ata et al. |
| 2002/0080938 A1 | 6/2002 | Alexander, III et al. |
| 2003/0172280 A1 | 9/2003 | Scheidt |
| 2003/0216143 A1 | 11/2003 | Roese |
| 2004/0143556 A1 | 7/2004 | Graubart et al. |
| 2004/0153671 A1 | 8/2004 | Schuyler et al. |
| 2005/0097320 A1 | 5/2005 | Golan et al. |
| 2006/0031682 A1 | 2/2006 | Sakai et al. |
| 2006/0082439 A1 | 4/2006 | Bazakos et al. |
| 2006/0164282 A1 | 7/2006 | Duff et al. |
| 2006/0210167 A1 | 9/2006 | Inoue |
| 2007/0171921 A1 | 7/2007 | Wookey |
| 2007/0210910 A1 | 9/2007 | Norstrom et al. |
| 2008/0018458 A1 | 1/2008 | Derrick et al. |
| 2009/0043445 A1 | 2/2009 | Bishop et al. |
| 2009/0198112 A1 | 8/2009 | Park et al. |
| 2010/0005526 A1 | 1/2010 | Tsuji |
| 2010/0014721 A1 | 1/2010 | Steinberg |
| 2010/0024042 A1 | 1/2010 | Motahari |
| 2010/0037056 A1 | 2/2010 | Follis et al. |
| 2010/0083385 A1 | 4/2010 | Uchida |
| 2010/0205667 A1 | 8/2010 | Anderson |
| 2010/0281254 A1 | 11/2010 | Carro |
| 2010/0299002 A1 | 11/2010 | Abdallah et al. |
| 2010/0302143 A1 | 12/2010 | Spivack |
| 2010/0325712 A1 | 12/2010 | Kakuta et al. |
| 2011/0206285 A1 | 8/2011 | Hodge |
| 2011/0219423 A1 | 9/2011 | Aad et al. |
| 2011/0219427 A1 | 9/2011 | Hito |
| 2011/0225426 A1 | 9/2011 | Agarwal et al. |
| 2011/0246766 A1 | 10/2011 | Orsini et al. |
| 2011/0247069 A1 | 10/2011 | Slater |
| 2011/0252131 A1 | 10/2011 | Karaoguz |
| 2011/0293095 A1 | 12/2011 | Ben Ayed |
| 2011/0321137 A1 | 12/2011 | Iida |
| 2011/0321143 A1 | 12/2011 | Angaluri et al. |
| 2012/0011559 A1 | 1/2012 | Miettinen et al. |
| 2012/0044089 A1 | 2/2012 | Yarnold |
| 2012/0072719 A1 | 3/2012 | Hui et al. |
| 2012/0079576 A1 | 3/2012 | Han et al. |
| 2012/0139755 A1 | 6/2012 | Ginsberg |
| 2012/0181333 A1 | 7/2012 | Krawczewicz |
| 2012/0185910 A1 | 7/2012 | Miettinen |
| 2012/0190386 A1 | 7/2012 | Anderson |
| 2012/0198570 A1 | 8/2012 | Joa |
| 2012/0239929 A1 | 9/2012 | Newman |
| 2012/0243687 A1 | 9/2012 | Li |
| 2012/0246739 A1 | 9/2012 | Mebed |
| 2012/0331527 A1 | 12/2012 | Walters et al. |
| 2013/0010966 A1 | 1/2013 | Li |
| 2013/0097709 A1 | 4/2013 | Basavapatna |
| 2013/0102283 A1 | 4/2013 | Lau |
| 2013/0103482 A1 * | 4/2013 | Song ................ G06Q 30/02 |
| | | 705/14.26 |
| 2013/0104203 A1 | 4/2013 | Davis |
| 2013/0151617 A1 | 6/2013 | Davis |
| 2013/0159876 A1 | 6/2013 | Narasimhan et al. |
| 2013/0177157 A1 | 7/2013 | Li |
| 2013/0197998 A1 | 8/2013 | Buhrmann et al. |
| 2013/0227712 A1 | 8/2013 | Salem |
| 2013/0262873 A1 | 10/2013 | Read et al. |
| 2013/0275498 A1 | 10/2013 | Cheng et al. |
| 2013/0290201 A1 | 10/2013 | Rodriguez Carrillo |
| 2013/0298248 A1 | 11/2013 | Boldrev |
| 2013/0318580 A1 | 11/2013 | Gudlavenkatasiva et al. |
| 2013/0318625 A1 | 11/2013 | Fan |
| 2013/0340089 A1 | 12/2013 | Steinberg |
| 2014/0007225 A1 | 1/2014 | Gay |
| 2014/0025485 A1 | 1/2014 | Niemeijer |
| 2014/0040137 A1 | 2/2014 | Carlson |
| 2014/0040467 A1 | 2/2014 | Agarwal et al. |
| 2014/0067679 A1 | 3/2014 | O'Reilly |
| 2014/0068702 A1 | 3/2014 | Hyndman |
| 2014/0082715 A1 | 3/2014 | Grajek |
| 2014/0112537 A1 | 4/2014 | Frank et al. |
| 2014/0121476 A1 | 5/2014 | Tran et al. |
| 2014/0123255 A1 | 5/2014 | Etchegoyen |
| 2014/0130127 A1 | 5/2014 | Toole |
| 2014/0173700 A1 | 6/2014 | Awan |
| 2014/0189786 A1 | 7/2014 | Castro |
| 2014/0201377 A1 | 7/2014 | Kadishay et al. |
| 2014/0282870 A1 | 9/2014 | Markwordt et al. |
| 2014/0380444 A1 | 12/2014 | Kelley |
| 2015/0019873 A1 | 1/2015 | Hagemann |
| 2015/0069219 A1 | 3/2015 | Klein et al. |
| 2015/0082399 A1 | 3/2015 | Wu |
| 2015/0089231 A1 | 3/2015 | Oxford |
| 2015/0089568 A1 | 3/2015 | Sprague et al. |
| 2015/0237038 A1 | 8/2015 | Grajek et al. |
| 2015/0288687 A1 | 10/2015 | Heshmati et al. |
| 2015/0324559 A1 | 11/2015 | Boss |
| 2015/0349883 A1 * | 12/2015 | Mitchell ............ H04B 10/116 |
| | | 398/118 |
| 2015/0363986 A1 | 12/2015 | Hoyos |
| 2016/0007083 A1 | 1/2016 | Gurha |
| 2016/0012655 A1 | 1/2016 | Hanson |
| 2016/0044001 A1 | 2/2016 | Pogorelik |
| 2016/0057110 A1 | 2/2016 | Li |
| 2016/0063640 A1 | 3/2016 | Ellingsworth |
| 2016/0068264 A1 | 3/2016 | Ganesh |
| 2016/0080252 A1 | 3/2016 | Ramchandran et al. |
| 2016/0082926 A1 | 3/2016 | Mouser et al. |
| 2016/0087950 A1 | 3/2016 | Barbir |
| 2016/0112522 A1 | 4/2016 | Abello |
| 2016/0112871 A1 | 4/2016 | White |
| 2016/0132684 A1 | 5/2016 | Barbas |
| 2016/0140257 A1 | 5/2016 | Vega |
| 2016/0164922 A1 | 6/2016 | Boss |
| 2016/0165650 A1 | 6/2016 | Kim |
| 2016/0165651 A1 | 6/2016 | Pathuri et al. |
| 2016/0212109 A1 | 7/2016 | Hird |
| 2016/0239683 A1 | 8/2016 | Gujral et al. |
| 2016/0241390 A1 | 8/2016 | Harris |
| 2016/0316449 A1 * | 10/2016 | Pitt ................... H04W 64/006 |
| 2016/0358441 A1 | 12/2016 | Mittleman |
| 2016/0380650 A1 | 12/2016 | Calder et al. |
| 2017/0053280 A1 | 2/2017 | Lishok et al. |
| 2017/0083345 A1 | 3/2017 | Sol |
| 2017/0163666 A1 | 6/2017 | Venkatramani |
| 2017/0195429 A1 | 7/2017 | Bokare et al. |
| 2017/0255940 A1 | 9/2017 | Kohli |
| 2018/0027517 A9 * | 1/2018 | Noonan ............. H04W 64/00 |
| | | 455/456.1 |
| 2018/0103021 A1 * | 4/2018 | Arunkumar ......... H04L 63/108 |
| 2018/0211464 A1 | 7/2018 | Kusens |
| 2018/0212976 A1 * | 7/2018 | Arunkumar ......... H04L 67/10 |
| 2018/0249398 A1 * | 8/2018 | Hillary ............. H04W 4/021 |

(56) References Cited

U.S. PATENT DOCUMENTS

FOREIGN PATENT DOCUMENTS

| | | |
|---|---|---|
| CN | 101950332 A | 1/2011 |
| CN | 202795383 U | 3/2013 |
| CN | 103354931 A | 10/2013 |
| CN | 105874464 | 1/2019 |
| EP | 1 703 431 A2 | 9/2006 |
| EP | 2 941 733 A1 | 11/2015 |
| EP | 3 087 531 A1 | 11/2016 |
| EP | 3166086 A1 | 5/2017 |
| JP | 2006259930 A | 9/2006 |
| JP | 2007293062 A | 11/2007 |
| JP | 2007304834 A | 11/2007 |
| JP | 2009086891 A | 4/2009 |
| JP | 2009140051 A | 6/2009 |
| JP | 20090140051 A | 6/2009 |
| JP | 2010128778 A | 5/2010 |
| JP | 20100128778 A | 6/2010 |
| JP | 2011004214 A | 1/2011 |
| JP | 2011134137 A | 7/2011 |
| JP | 20120235424 A | 11/2012 |
| JP | 2012248027 A | 12/2012 |
| JP | 20130246465 A | 12/2013 |
| JP | 2014086865 A | 5/2014 |
| JP | 2016-503208 A | 2/2016 |
| JP | 6205062 B2 | 9/2017 |
| JP | 6314267 B2 | 4/2018 |
| WO | WO 2012/162009 A1 | 11/2012 |
| WO | 2013101215 A1 | 7/2013 |
| WO | 2014/107435 A1 | 7/2014 |
| WO | 2015/100192 A1 | 7/2015 |

OTHER PUBLICATIONS

Holland et al, Geolocation-Based Architecture for Heterogenous Spectrum Usage in 5G, IEEE, 2015, pp. 1-6.*
Fake GPS Location app, https://play.google.com/store/apps/details?id=com.lexa.fakegps&hl=en, as accessed Feb. 23, 2017, Lexa Tools.
How SUPL Reveals My Identity and Location to Google When I Use GPS, http://mobilesociety.typepad.com/mobile_life/2014/08/supl-reveals-my-identity-and-location-to-google.html, published Aug. 31, 2014, Mobilesociety.
Assisted GPS, https://en.wikipedia.org/wiki/Assisted_GPS, as accessed Feb. 24, 2017, Wikipedia.
Lei Gu, et al; Systems and Methods for Enforcing Access-Control Policies; U.S. Appl. No. 15/194,403, filed Jun. 27, 2016.
HomeNews—WiFi can be used to count people with or without electronic gadgets; https://www.rt.com/news/266188-wifi-signal-human-density/; as accessed on Jun. 21, 2016; Jun. 10, 2015.
Ali et al.; Keystroke Recognition Using WiFi Signals; https://www.sigmobile.org/mobicom/2015/papers/p90-aliA.pdf; Sep. 7, 2015.
iRobot's Roomba 980 Maps Your Home Via Camera and Takes Smartphone Commands; http://blogs.wsj.com/personal-technology/2015/09/16/irobots-roomba-980-maps-your-home-via-camera-and-takes-smartphone-commands/; as accessed on Jun. 21, 2016; Sep. 16, 2015.
Microsoft Hololens; https://www.microsoft.com/microsoft-hololens/en-us; as accessed on Jun. 21, 2016.
Bruce McCorkendale, et al; Systems and Methods for Constructing a Volumetric Model of a Space from a Constellation of Sensing Devices; U.S. Appl. No. 14/833,655, filed Aug. 24, 2015.
Daniel Marino, et al; Systems and Methods for Enforcing Data-Loss-Prevention Policies Using Mobile Sensors; U.S. Appl. No. 13/733,131, filed Jan. 2, 2013.
DEVICELOCK; Preventing Devastating Data Leaks by Securing the Endpoints of Your Network; http://www.devicelock.com/products/, as accessed on Sep. 10, 2012.
Konstantinos Kotis et al.; An ontology for the automated deployment of applications in heterogeneous IoT environments; http://www.semantic-web-journal.net/sites/default/files/swj247_0.pdf, as accessed Jun. 25, 2015; Semantic Web Journal; Feb. 13, 2012.
OMA Device Management; http://openmobilealliance.org/about-oma/work-program/device-management/, as accessed Jun. 25, 2015; Jan. 15, 2013.
Open Mobile Alliance (OMA); http://openmobilealliance.org/, as accessed Jun. 25, 2015; Aug. 2, 2002.
openHAB; http://www.openhab.org/, as accessed Jun. 25, 2015; Jul. 11, 2011.
Daniel Siewiorek; SenSay: A Context-Aware Mobile Phone; Human Computer Interaction and Institute for Complex Engineered Systems; as accessed on Sep. 10, 2012.
Megan Treacy; 10 environmental sensors that go along with you; http://www.treehugger.com/clean-technology/environmental-sensors.html, as accessed Jun. 25, 2015; Mar. 5, 2013.
ZENPRISE; Mobile DLP (Data Leakage Prevention); http://www.zenprise.com/solutions/mobile-data-leakage-prevention/, as accessed on Sep. 10, 2012.
Alastair R. Beresford et al., MockDroid: trading privacy application functionality on smartphones; Proceedings of the 12th Workshop on Mobile Computing Systems and Applications, HotMobile '11, Phoenix, Arizona, Mar. 1-3, 2011.
Jason Franklin et al.; Passive Data Link Layer 802.11 Wireless Device Driver Fingerprinting; Proceedings of USENIX Security '06, Jul. 31-Aug. 4, 2006, Vancouver, BC, Canada.
School of Privacy, Guide on How to be Safe, Secure and Protect Your Online Anonymity; Fake GPS Location—Android; http://school-of-privacy.com/post/70381068300/fake-gps-location-andoid; Dec. 18, 2013.
SensorSimulator; https://code.google.com/p/openintents/wiki/SensorSimulator; Jan. 12, 2013.
William E. Sobel, et al.; Systems and Methods for Introducing Variation in Sub-System Output Signals to Prevent Device Fingerprinting; U.S. Appl. No. 14/139,824, filed Dec. 23, 2013.
C. Rigney et al; Remote Authentication Dial in User Service (RADIUS); https://tools.ietf.org/html/rfc2865, as accessed Nov. 6, 2015; Request for Comments: 2865; Jun. 2000.
C. Neuman et al; The Kerberos Network Authentication Service (V5); https://tools.ietf.org/html/rfc4120, as accessed Nov. 6, 2015; Request for Comments: 4120; Jul. 2005.
Kerberos: The Network Authentication Protocol; http://web.mit.edu/kerberos/, as accessed Nov. 6, 2016; Jan. 28, 1999.
Microsoft Negotiate; https://msdn.microsoft.com/en-us/library/windows/desktop/aa378748(v=vs.85).aspx. as accessed Nov. 6, 2015; Nov. 13, 2011.
Microsoft NTLM; https://msdn.microsoft.com/en-us/library/windows/desktop/aa378749(v=vs.85).aspx, as accessed Nov. 6, 2015; Nov. 12, 2011.
Prasad Bokare, et al; Systems and Methods for Facilitating Single Sign-On for Multiple Devices; U.S. Appl. No. 15/041,040, filed Feb. 11, 2016.
Symantec Identity Access Manager; https://www.symantec.com/identity-access-manager/, as accessed Nov. 6, 2015; Symantec Corporation; Nov. 7, 2014.
Symantec Validation and ID Protection Service; http://www.symantec.com/vip-authentication-service/, as accessed Nov. 6, 2015; Symantec Corporation; Feb. 10, 2014.
Ramakrishnan Meenakshi Sundaram; Systems and Methods for Managing Smart Building Systems; U.S. Appl. No. 15/041,002, filed Feb. 10, 2016.
ZigBee Alliance, http://www.zigbee.org/, as accessed Dec. 14, 2015, (Nov. 14, 2001).
Z-Wave, http://www.z-wave.com/, as accessed Dec. 14, 2015, (Dec. 23, 2002).
OMA Device Management Working Group, http://openmobilealliance.org/about-oma/work-program/device-management/, as accessed Dec. 14, 2015, (Jan. 15, 2013).
Lei Gu, et al; Systems and Methods for Enforcing Access-Control Policies in an Arbitrary Physical Space; U.S. Appl. No. 15/195,677, filed Jun. 28, 2016.
Bruce McCorkendale; Systems and Methods for Authenticating Users; U.S. Appl. No. 14/834,949, filed Aug. 25, 2015.
Home—Good Security Questions; http://goodsecurityquestions.com/, as accessed Jun. 25, 2015, (Dec. 27, 2007).

(56) References Cited

OTHER PUBLICATIONS

Kevin Jiang, et al; Systems and Methods for Using Vehicles as Information Sources for Knowledge-Based Authentication; U.S. Appl. No. 14/979,620, filed Dec. 28, 2015.
Snapshot; https://www.progressive.com/auto/snapshot/, as accessed Nov. 18, 2015; Progressive Casualty Insurance Company; on or before Nov. 18, 2015.
FasTrak; https://www.bayareafastrak.org/en/howitworks/gettingstarted.shtml, as accessed Nov. 18, 2015; on or before Nov. 18, 2015.
Ilya Sokolov, et al; Systems and Methods for Verifying User Attributes; U.S. Appl. No. 14/985,675, filed Dec. 31, 2015.
E-ZPass, https://www.e-zpassny.com/en/home/index.shtml, as accessed Nov. 18, 2015, (on or before Nov. 18, 2015).
FASTPASS, https://disneyland.disney.go.com/guest-services/fastpass/, as accessed Nov. 18, 2015, Disney, (on or before Nov. 18, 2015).
Toll Payment Options at the Golden Gate Bridge, http://www.goldengate.org/tolls/tollpaymentoptions.php, as accessed Nov. 18, 2015, (on or before Nov. 18, 2015).
OnStar, https://www.onstar.com/us/en/home.html, as accessed Nov. 18, 2015, (on or before Nov. 18, 2015).
BMW Assist, http://www.bmwusa.com/Standard/Content/Explore/BMWValue/BMWAssist/default.aspx, as accessed Nov. 18, 2015, (on or before Nov. 18, 2015).
Department of Motor Vehicles, https://www.dmv.ca.gov/portal/dmv, as accessed Nov. 18, 2015, (on or before Nov. 18, 2015).
Ilya Sokolov, et al; Systems and Methods for Evaluating Identity Intensity; U.S. Appl. No. 15/057,618, filed Mar. 1, 2016.
Evgenios Kornaropoulos, et al; Systems and Methods for Securely Detecting Data Similarities; U.S. Appl. No. 14/871,868, filed Sep. 30, 2015.
Symantec VIP Intelligent Authentication, http://www.symantec.com/content/en/us/enterprise/fact_sheets/b-vip_intelligent_authentication_DS_21213685.en-us.pdf, as accessed Jan. 13, 2016, Data Sheet: Authentication, Symantec Corporation, (Oct. 2011).
Ilya Sokolov et al.; Systems and Methods for Securely Sharing Cloud-Service Credentials Within a Network of Computing Devices; U.S. Appl. No. 15/276,105, filed Sep. 26, 2016.
Amazon Echo, Nov. 6, 2014: https://en.wikipedia.org/wiki/Amazon_Echo.
Google Home, announced May 18, 2016: https://en.wikipedia.org/wiki/Google_Home.
Secret sharing, as accessed on Sep. 13, 2016: https://en.wikipedia.org/wiki/Secret_sharing.
Norton Identity Safe, announced Aug. 28, 2007: https://identitysafe.norton.com/.
Temple, James, "Accelerometer IDs smartphones in seconds", SFGATE, URL: http://www.sfgate.com/technology/dotcommentary/article/accelerometer-IDs-smartphone-in-seconds-4885711.php, Oct. 10, 2013, 6 pages.
International Search Report and Written Opinion received for International Patent Application Serial No. PCT/US2013/078319 dated Apr. 16, 2014, 7 pages.
International Search Report and Written Opinion received for International Patent Application Serial No. PCT/US2014/071791 dated Mar. 19, 2015, 8 pages.
Abadi et al, Traffic Flow Predicition for Road Transporation Networks with Limited Traffic Data, IEEE, vol. 16, No. 2, Apr. 2015, pp. 653-662.
Baek et al, An Authentication Framework for Automatic Dependent Survelliance-Broadcast Based on Online/Offline Identity-Based Signature, IEEE, 2013, pp. 358-363.
Michael Buhrmann, et al.; Mobile Wallet Security; U.S. Appl. No. 61/591,232, filed Jan. 26, 2012.
Malek Ben Salem, et al.; Adaptive Risk-Based Access Controls; U.S. Appl. No. 61/602,427, filed Feb. 23, 2012.
Nair et al., "On Channel Failures, File Fragmentation Policies, and Heavy-Tailed Completion Times", IEEE/ACM Transactions on Networking, vol. 24, No. 1, Feb. 2016, pp. 529-541.
Ciriani et al., "Combining Fragmentation and Encryption to Protect Privacy in Data Storage", ACM Transactions on Information and System Security (TISSEC), vol. 13, No. 3, Article 22, Jul. 2010, 33 pages.
Mei et al., "Secure Dynamic Fragment and Replica Allocation in Large-Scale Distributed File Systems", IEEE Transactions on Parallel and Distributed Systems, vol. 14, No. 9, Sep. 2003, pp. 885-896.
Zola et al., "ENIGMA: Distributed Virtual Disks for Cloud Computing", IEEE International Parallel and Distributed Processing Symposium, 2011, pp. 898-906.

\* cited by examiner

SYSTEMS AND METHODS FOR CERTIFYING GEOLOCATION COORDINATES OF COMPUTING DEVICES

BACKGROUND

Increasing numbers of software applications directly utilize information about the physical location of a user as part of providing various real-world services. For example, people using an assortment of mobile device applications can request a car through UBER or LYFT, order food from GRUBHUB, or play augmented reality games such as INGRESS and POKEMON GO. These applications generally require the actual physical location of the user to provide the requested service. Fortunately, many mobile devices can determine and provide geolocation coordinates that identify their physical location.

However, the applications that service providers provide to clients generally trust that clients will provide correct location information. Malicious individuals can easily spoof their physical location using a variety of established techniques. Even traditional methods of verifying a user's location, such as IP geolocation, can be foiled with readily available tools. Malicious individuals may use the spoofed location information to cheat at a game, trick a legitimate business into paying for services not rendered, or even claim government benefits to which they are not entitled. In this way, malicious individuals can cause actual financial, reputation, and other damages to service providers by using fraudulent location information. The instant disclosure, therefore, identifies and addresses a need for systems and methods for certifying geolocation coordinates of computing devices.

SUMMARY

As will be described in greater detail below, the instant disclosure describes various systems and methods for certifying geolocation coordinates of computing devices. In one example, a computer-implemented method for certifying geolocation coordinates of computing devices may include (i) receiving, from a client computing device, a set of geolocation coordinates that purport to identify the physical location of the client computing device, (ii) identifying, in response to receiving the geolocation coordinates, at least one cooperating geolocation device that is within physical proximity to the geolocation coordinates provided by the client computing device, (iii) performing a proximity validation check that demonstrates that the client computing device is within physical proximity to the cooperating geolocation device, and (iv) certifying, based on the proximity validation check, the geolocation coordinates as valid geolocation coordinates.

Performing the proximity validation check may include performing a variety of tasks. For example, performing the proximity validation check may include receiving, from the client computing device, evidence that the client computing device detected at least one transmission from the cooperating geolocation device. In such an example, the transmission may include (i) a radio frequency transmission, (ii) an audio transmission, (iii) a visible-light spectrum transmission, and/or (iv) an infrared-light spectrum transmission. Additionally or alternatively, performing the proximity validation check may include receiving confirmation from the cooperating geolocation device that the cooperating geolocation device detected at least one transmission from the client computing device.

Furthermore, performing the proximity validation check may include instructing the client computing device to provide a secret code to the cooperating geolocation device. In such embodiments, performing the proximity validation check may also include receiving confirmation from the cooperating geolocation device that the client computing device provided the correct secret code to the cooperating geolocation device.

Performing the proximity validation check may, in some embodiments, include determining a proximity confidence score that represents a level of confidence that the client computing device is located at the geolocation coordinates. This proximity confidence score may be based at least partially on the number of cooperating geolocation devices demonstrated to be within physical proximity of the client computing device. Furthermore, the proximity confidence score may be based on a combination of reputation scores assigned to each cooperating geolocation device demonstrated to be within physical proximity of the client computing device. In these examples, the reputation score assigned to a given cooperating geolocation device may represent a level of trust in the given cooperating geolocation device to accurately perform the proximity validation check.

The backend computing system may also refuse to allow certain device to act as a cooperating geolocation device. For example, the backend computing system may disallow devices that meet predetermined criteria from acting as cooperating geolocation devices.

The location of the cooperating geolocation device may be established in a variety of ways. In one embodiment, the cooperating geolocation device may have a previously established physical location that is known to the backend computing system. Additionally or alternatively, the cooperating geolocation device may, during the proximity validation check, determine a set of cooperating geolocation coordinates for the cooperating geolocation device and provides these cooperating geolocation coordinates to the backend computing system.

In one embodiment, a system for implementing the above-described method may include (i) a receiving module, stored in a memory of the system, that receives, from a client computing device, a set of geolocation coordinates that purport to identify the physical location of the client computing device, (ii) an identification module, stored in the memory, that, in response to receiving the geolocation coordinates, identifies at least one cooperating geolocation device that is within physical proximity to the geolocation coordinates provided by the client computing device, (iii) a validation module, stored in the memory, that performs a proximity validation check to demonstrate that the client computing device is within physical proximity to the cooperating geolocation device, (iv) a certifying module, stored in the memory, that certifies, based on the proximity validation check, the geolocation coordinates as valid geolocation coordinates, and (v) at least one physical processor configured to execute the receiving module, the identification module, the validation module, and the certifying module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive, from a client computing device, a set of geolocation coordinates that purport to identify the physical location of the client computing device, (ii) identify, in response to receiving the geolocation coordinates, at least one cooperating geolocation device that is within physical proximity to the geolocation coordinates provided by the client computing device, (iii) perform a proximity validation check that demonstrates that the client computing device is within physical proximity to the cooperating geolocation device, and (iv) certify, based on the proximity validation check, the geolocation coordinates as valid geolocation coordinates.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
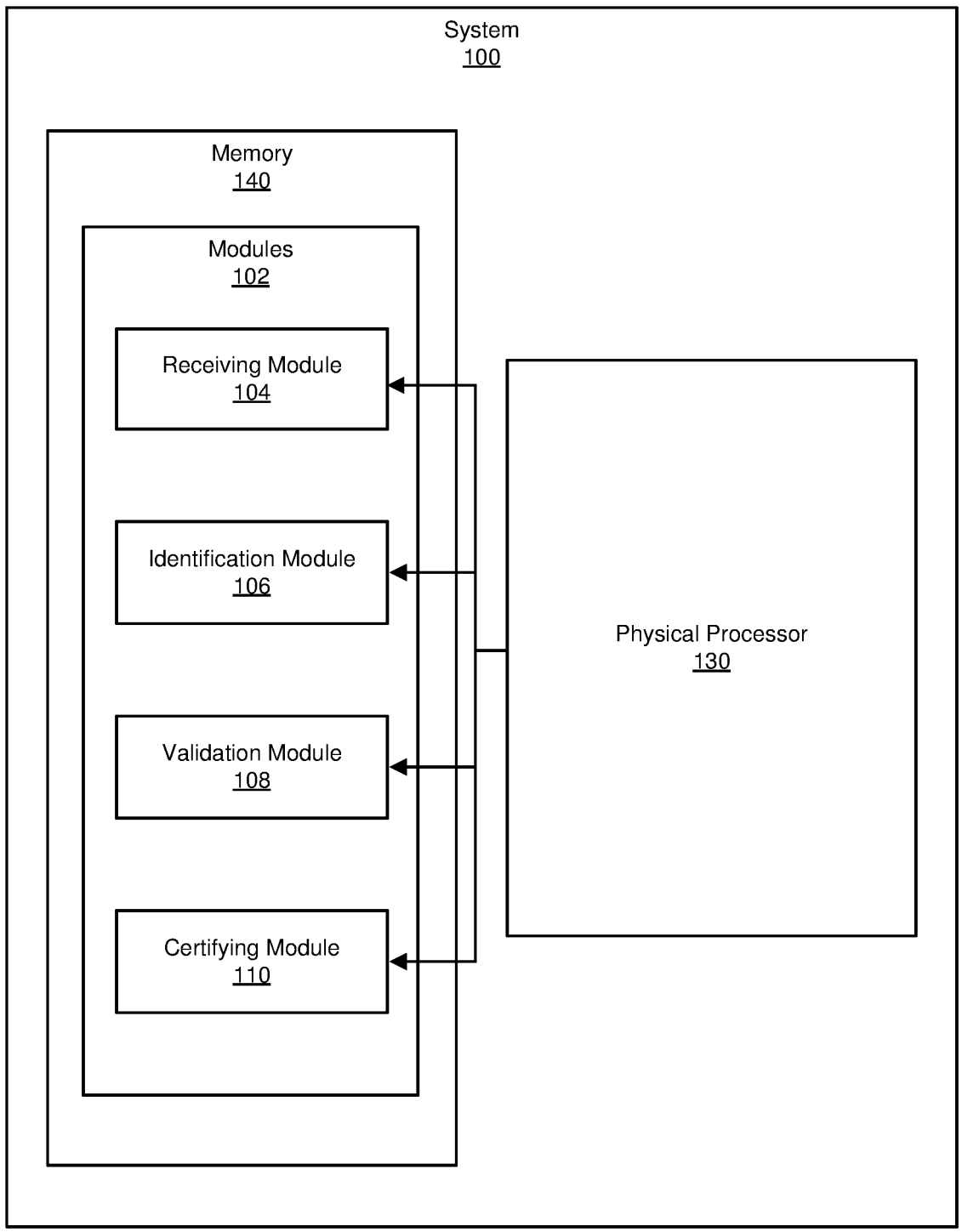
FIG. 1 is a block diagram of an example system for certifying geolocation coordinates of computing devices.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for certifying geolocation coordinates of computing devices. As will be described in greater detail below, the systems and methods described herein may validate geolocation information provided by a client device by determining that the client device is within physical proximity of other known and/or trusted devices. The described systems and methods may then certify the geolocation information, allowing other services and/or systems to use the geolocation information with confidence that it is authentic geolocation information. By verifying geolocation information in this way, the systems and methods described herein may be able to provide a secure, difficult-to-spoof method of obtaining accurate geolocation information for a wide variety of client devices without necessarily requiring costly specialized services and/or equipment.

Furthermore, the systems and methods described herein may improve the functioning of mobile devices by enabling those devices to provide certified geolocation information to various service providers. Those service providers may then in turn be able to provide valuable services and/or information to the mobile devices based on the mobile devices providing trustworthy geolocation information. These systems and methods may also improve the field of e-commerce by ensuring that service providers are able to acquire accurate geolocation information for client devices, thereby preventing malicious individuals from illegitimately acquiring goods or services that they should not be receiving.

Figure 2:
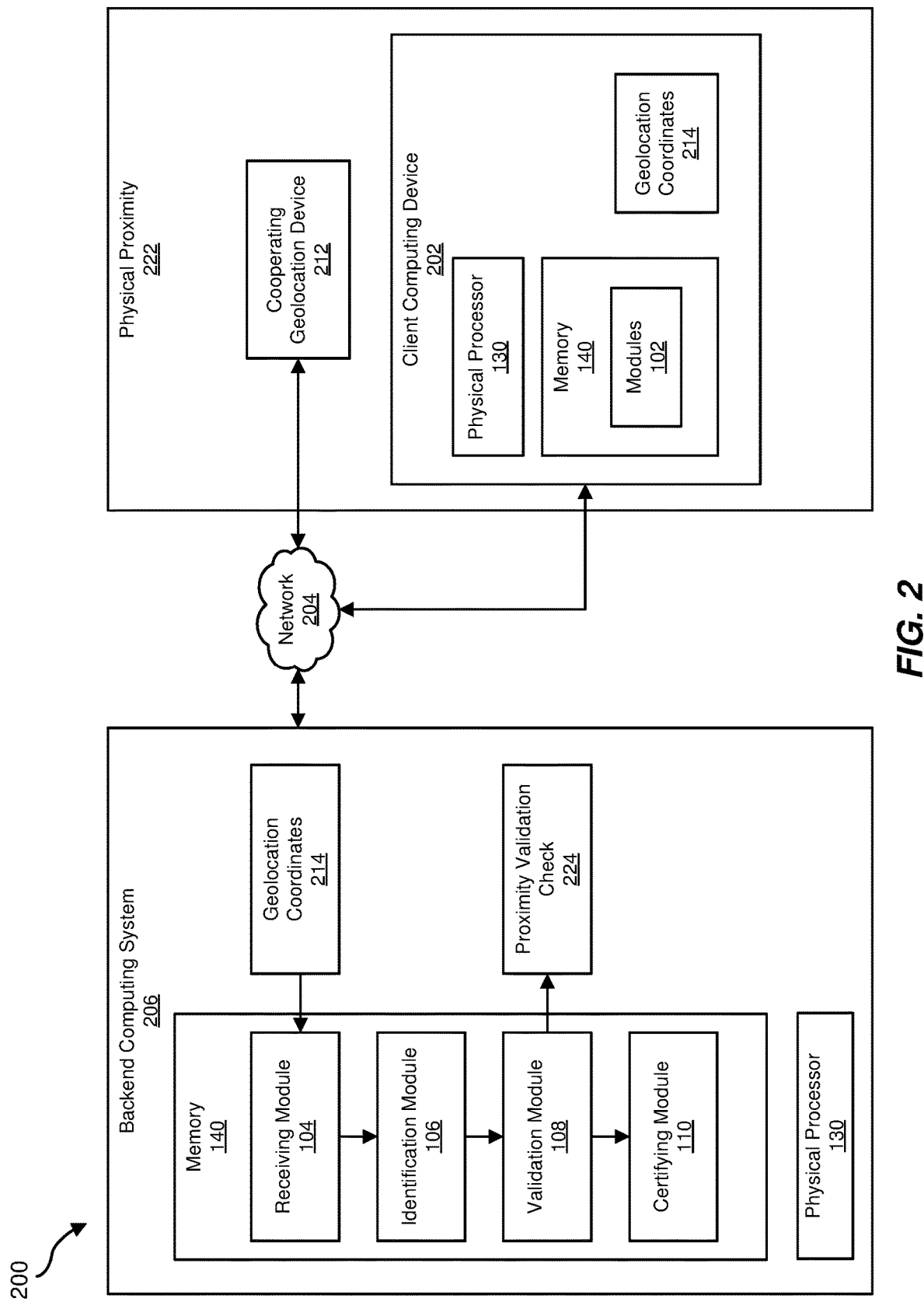
FIG. 2 is a block diagram of an additional example system for certifying geolocation coordinates of computing devices.

The following will provide, with reference to FIGS. 1-2, detailed descriptions of example systems for certifying geolocation coordinates of computing devices. Detailed descriptions of corresponding computer-implemented methods will also be provided in connection with FIG. 3. Detailed descriptions of a constellation of cooperating geolocation devices will be provided in connection with FIG. 4, and detailed descriptions of a proximity validation check will be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of example system 100 for certifying geolocation coordinates of computing devices. As illustrated in this figure, example system 100 may include one or more modules 102 for performing one or more tasks. For example, and as will be explained in greater detail below, example system 100 may include a receiving module 104 that receives, from a client computing device, a set of geolocation coordinates that purport to identify the physical location of the client computing device. Example system 100 may additionally include an identification module 106 that identifies, in response to receiving the geolocation coordinates, at least one cooperating geolocation device that is within physical proximity to the geolocation coordinates provided by the client computing device. Example system 100 may also include a validation module 108 that performs a proximity validation check that demonstrates that the client computing device is within physical proximity to the cooperating geolocation device. Example system 100 may additionally include a certifying module 110 that certifies, based on the proximity validation check, the geolocation coordinates as valid geolocation coordinates. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., client computing device 202 and/or backend computing system 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate certifying geolocation coordinates of computing devices. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a client computing device 202 in communication with a backend computing system 206 via a network 204. In various examples, all or a portion of the functionality of modules 102 may be performed by client computing device 202, backend computing system 206, and/or any other suitable computing system. As will be described in greater detail below, one or more of modules 102 from FIG. 1 may, when executed by at least one processor of client computing device 202 and/or backend computing system 206, enable client computing device 202 and/or backend computing system 206 to validate geolocation coordinates for client computing device 202 that may then be provided to various services that require valid geolocation coordinates. For example, and as will be described in greater detail below, receiving module 104 may receive, from client computing device 202, a set of geolocation coordinates 214 that purport to identify the physical location of client computing device 202. In response to receiving geolocation coordinates 214, identification module 106 may identify at least one cooperating geolocation device 212 that is within physical proximity 222 to geolocation coordinates 214 provided by client computing device 202. Validation module 108 may perform a proximity validation check 224 that demonstrates that client computing device 202 is within physical proximity 222 to cooperating geolocation device 212. Certifying module 110 may certify, based on proximity validation check 224, geolocation coordinates 214 as valid geolocation coordinates.

Client computing device 202 generally represents any type or form of computing device capable of reading computer-executable instructions. In some embodiments, client computing device 202 may additionally be capable of determining geolocation coordinates that represent its physical location and providing those geolocation coordinates to a backend computing system. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Backend computing system 206 generally represents any type or form of computing device that is capable of receiving geolocation information from client devices, validating the geolocation information, and then providing some form of assurance (e.g., digitally signed geolocation information) to third parties that the geolocation information is valid. Additional examples of backend computing system 206 include, without limitation, security servers, application servers, web servers, storage servers, and/or database servers configured to run certain software applications and/or provide various security, web, storage, and/or database services. Although illustrated as a single entity in FIG. 2, backend computing system 206 may include and/or represent a plurality of servers that work and/or operate in conjunction with one another.

Network 204 generally represents any medium or architecture capable of facilitating communication or data transfer. In one example, network 204 may facilitate communication between computing device 202 and backend computing system 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Cooperating geolocation device 212 generally represents any type or form of device that is capable of identifying itself to client computing device 202 and/or backend computing system 206. In general, cooperating geolocation device 212 may be referred to as an "Internet of Things" (IoT) device. Specifically, cooperating geolocation device may be a device that is embedded in an everyday object, such as an appliance or vehicle, and interconnected with other devices via a network, such as network 204 and/or the Internet. In some embodiments, cooperating geolocation device 212 may be a computing device that transmits and/or receives a signal. As will be described in greater detail below, this signal may be broadcast in a variety of ways, including but not limited to transmissions in infrared, visible, and/or radio frequencies, audio frequencies, etc. Examples of cooperating geolocation device 212 that transmit a signal include, without limitation, wireless routers, base stations, access points, wireless beacons, wireless-enabled vehicles, other devices equipped with wireless communication devices, smart light bulbs, devices with audio speakers, devices with microphones, combinations of one or more of the same, and/or any other device that is capable of transmitting and/or receiving communications.

Geolocation coordinates 214 generally represents any information that may be used to determine the physical location of client computing device 202. In some examples, geolocation coordinates 214 may be coordinates that follow a specific coordinate standard, such as Global Positioning System (GPS) coordinates. Additionally or alternatively, geolocation coordinates 214 may include a street address, map coordinates, relative coordinates (e.g., a specified distance from a known point) and/or any other suitable information by which to determine the physical location of client computing device 202.

Figure 3:
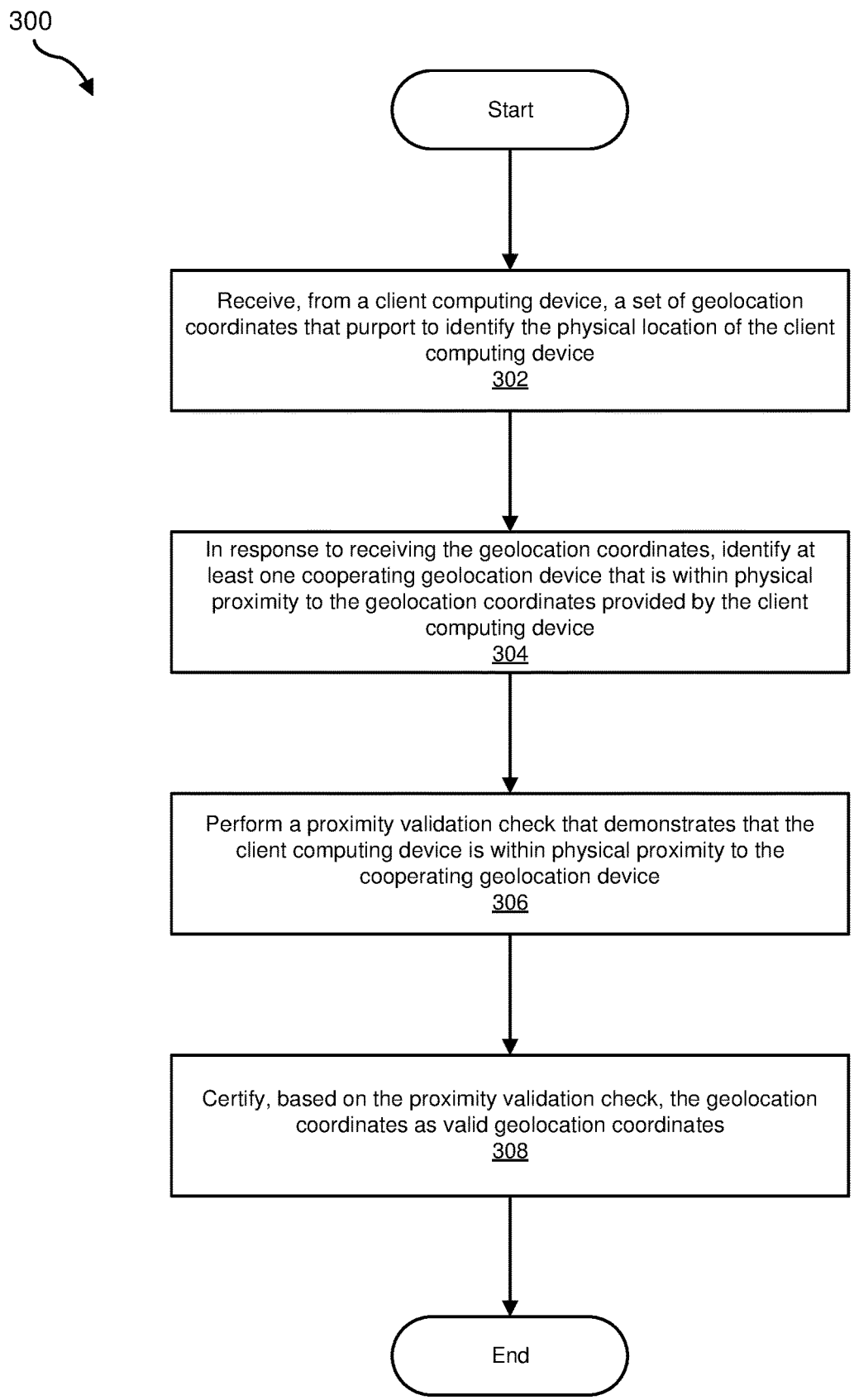
FIG. 3 is a flow diagram of an example method for certifying geolocation coordinates of computing devices.

FIG. 3 is a flow diagram of an example computer-implemented method 300 for certifying geolocation coordinates of computing devices. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may receive, from a client computing device, a set of geolocation coordinates that purport to identify the physical location of the client computing device. For example, receiving module 104 may, as part of backend computing system 206 in FIG. 2, receive, from a client computing device 202, a set of geolocation coordinates 214 that purport to identify the physical location of client computing device 202.

In one example, receiving module 104 may receive geolocation coordinates 214 directly from the client computing device. For example, receiving module 104 may receive geolocation coordinates 214 directly from client computing device 202 as part of a request to forward certified geolocation coordinates to a service provider. In these embodiments, such a request may include information (such as a URL and/or IP address) identifying the service provider (e.g., service provider 504 in FIG. 5) that is the ultimate intended recipient of geolocation coordinates 214. As will be described in greater detail below, other elements of modules 102 may later forward certified geolocation coordinates to the service provider on behalf of client computing device 202.

In some cases, the request may not include information that identifies a service provider. In these embodiments, one or more of modules 102 may simply return a digitally signed version of geolocation coordinates 214 to client computing device 202, as will be described in greater detail below. Additionally or alternatively, one or more elements of modules 102 may store certified geolocation coordinates corresponding to client computing device 202 along with a "last-verified" timestamp that indicates the most recent point in time at which the systems and methods described herein certified geolocation coordinates for client computing device 202.

In further embodiments, backend computing system 206 may receive geolocation coordinates 214 from a service provider that wishes to validate geolocation coordinates that the service provider received from client computing device 202. In these embodiments, the verification request may include information that identifies client computing device 202, such as a MAC address, IP address, phone number, International Mobile Subscriber Identity (IMSI) number, Mobile Equipment Identifier (MEID), Integrated Circuit Card Identifier (ICCID), combinations of one or more of the same, and/or any other suitable method of uniquely identifying client computing device 202. Regardless of the context in which receiving module 104 receives geolocation coordinates 214, reception of geolocation coordinates 214 may automatically trigger the verification of whether geolocation coordinates 214 are valid geolocation coordinates for client computing device 202.

Returning to FIG. 3 at step 304, one or more of the systems described herein may identify, in response to receiving the geolocation coordinates, at least one cooperating geolocation device that is within physical proximity to the geolocation coordinates provided by the client computing device. For example, identification module 106 may, as part of backend computing system 206 in FIG. 2, identify, in response to receiving the geolocation coordinates, at least one cooperating geolocation device 212 that is within physical proximity 222 to geolocation coordinates 214 provided by client computing device 202.

Identification module 106 may identify cooperating geolocation device 212 in a variety of ways. For example, client computing device 202 may report that it can "see" (e.g., detect a transmission from, or, for camera-equipped devices, acquire visual confirmation of) cooperating geolocation device 212. Additionally or alternatively, one or more cooperating computing devices may inform identification module 106 that they can "see" client computing device 202.

Figure 4:
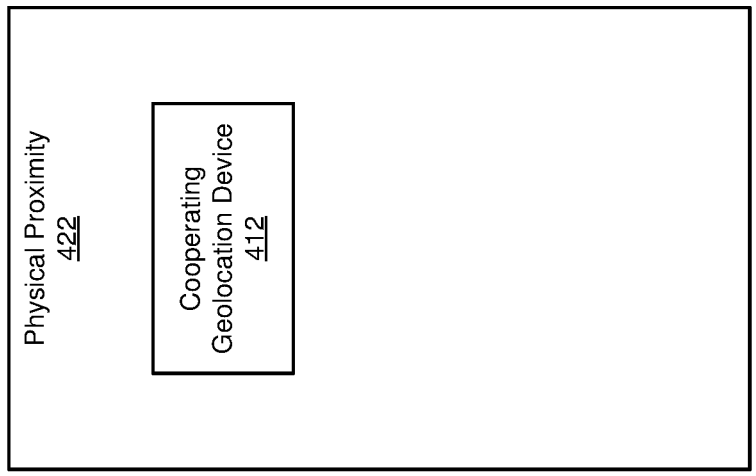
FIG. 4 is a block diagram of an example computing system for certifying geolocation coordinates of computing devices incorporating a constellation of cooperating geolocation devices.
Figure 4:
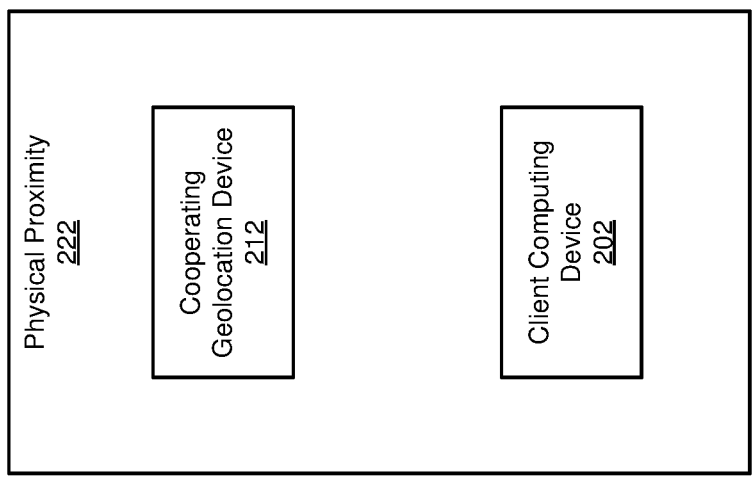

An example illustration of various cooperating geolocation devices located in various physical locations is provided in FIG. 4. As shown in FIG. 4, cooperating geolocation device 212 and client computing device 202 may be located within physical proximity 222 of each other. Accordingly, client computing device 202 and cooperating geolocation device 212 may be able to detect transmissions from one another, or, as described above, may be considered as able to "see" each other. An additional cooperating geolocation device 412 may be located elsewhere, such as within physical proximity 422. However, as client computing device 202 is not within physical proximity 422 of cooperating geolocation device 412, these two devices may be unable to "see" each other.

Additionally or alternatively, identification module 106 may identify cooperating geolocation devices that are within physical proximity to geolocation coordinates 214. Identification module 106 may locate these cooperating geolocation devices in a variety of ways. In some embodiments, cooperating geolocation device 212 may have a previously established physical location that is known to backend computing system 206. For example, backend computing system 206 may maintain a database of registered cooperating geolocation devices along with information identifying the physical location of each registered device. Such a database may include entries for cooperating geolocation devices with fixed locations. Examples of cooperating geolocation devices with fixed locations include stationary wireless access points, beacons attached to landmarks such as bus stops, Quick Recognition (QR) codes affixed to stationary objects such as buildings, stationary audio devices such as Public Address (PA) systems integrated into a building, audio devices built into a stationary landmark, devices specifically designed for cooperation with the systems and methods described herein, and/or any other suitable stationary device that can detect and/or be detected by client computing device 202.

Returning reference to FIG. 4, physical proximity 222 may represent a physical space surrounding geolocation coordinates 214. Under this interpretation of FIG. 4, identification module 106 may search a database of cooperating geolocation devices for cooperating geolocation devices that are within physical proximity 222. Identification module 106 may discover that cooperating geolocation device 212 is within physical proximity 222 and prompt other elements of modules 102 to use cooperating geolocation device 212 to validate geolocation coordinates 214.

In some examples, the cooperating geolocation device(s) may not have a fixed location. For example, the cooperating geolocation device(s) may move according to a fixed schedule, such as wireless access points attached to a public transit vehicle. As a specific example, cooperating geolocation device 212 may be a wireless access point embedded in a train car or municipal transit bus. For devices that move according to a fixed or otherwise predictable schedule, this schedule may be recorded in a database maintained by backend computing system 206 as a listing of locations associated with times that cooperating geolocation device 212 is expected to be at those locations and/or any other suitable mode of determining the expected route of cooperating geolocation device 212.

Additionally or alternatively, cooperating geolocation device 212 may be a trusted geolocation device that is capable of reporting its location to backend computing system 206. For example, cooperating geolocation device 212 may be a purpose-built location-verification device that includes a geolocation module, such as a GPS receiver, in addition to a wireless networking module. Such trusted geolocation devices may also include anti-spoofing measures such as a Trusted Platform Module (TPM), that allows the trusted geolocation device to provide some form of assurance to backend computing system 206 that transmissions from the trusted geolocation device originated from the trusted geolocation device and have not been tampered with.

In some embodiments, various cooperating geolocation devices may routinely provide backend computing system 206 with a list of detectable nearby computing devices. For example, a cooperating geolocation device may regularly provide backend computing system 206 with a list of unique identifiers describing mobile devices within communication range of that cooperating geolocation device. In these embodiments, backend computing system 206 may identify cooperating geolocation device 212 by searching all available lists received from cooperating geolocation devices and determining which cooperating geolocation devices have reported being able to detect the presence of client computing device 202.

While any device that is capable of detecting and/or communicating with client computing device 202, and/or of communicating with backend computing system 206 may be capable of serving as a cooperating geolocation device, backend computing system 206 may nevertheless disallow certain devices from fulfilling this role. For example, backend computing system 206 may disallow devices that meet predetermined criteria from acting as cooperating geolocation devices. A specific example of such predetermined criteria may include devices that are typically found in physical proximity to each other (e.g., a user's smart phone and their smart watch), as such regular physical proximity may indicate that the two devices are owned by the same person. If this person happens to be a malicious individual seeking to subvert applications or other programs that make use of geolocation coordinates, permitting that user to use their own devices to "vouch" for the physical position of another one of their devices may result in the malicious individual being able to provide spoofed or otherwise fraudulent geolocation coordinates to a service provider.

Additionally or alternatively, backend computing system 206 may prevent unapproved devices from serving as a cooperating geolocation device. For example, backend computing system 206 may maintain a database of devices known to be trustworthy, and prevent devices not represented in the database from serving as a cooperating geolocation device. Even in embodiments where backend computing system 206 permits devices not represented in such a database to serve as cooperating geolocation devices, these untrusted devices may be granted a lesser weight when determining whether to validate geolocation coordinates 214, as will be described in greater detail below.

At step 306 in FIG. 3, one or more of the systems described herein may perform a proximity validation check that demonstrates that the client computing device is within physical proximity to the cooperating geolocation device. For example, validation module 108 may, as part of backend computing system 206 in FIG. 2, perform proximity validation check 224 that demonstrates that client computing device 202 is within physical proximity 222 to cooperating geolocation device 212.

Validation module 108 perform a variety of tasks as part of performing proximity validation check 224. In some embodiments, validation module 108 may receive evidence from client computing device 202 indicating that client computing device 202 detected at least one transmission from the cooperating geolocation device. As a specific example, cooperating geolocation device 212 may be a wireless access point with a known physical location. In this example, client computing device 202 may provide evidence that it can detect an SSID being broadcast by the wireless access point. As an additional example, cooperating geolocation device 212 may be a purpose-built cooperating geolocation device that flashes a light in a previously established pattern. In this example, client computing device 202 may report the flash pattern to validation module 108 as evidence that client computing device 202 can detect a visual light transmission from cooperating geolocation device 212.

The detected transmission may take any suitable form besides those in the above-described examples. For example, the transmission may include a radio frequency transmission, an audio transmission (e.g., from a radio, PA system, or other speaker-equipped device), a visible-light spectrum transmission, an infrared-light spectrum transmission, or any other suitable medium for communicating information.

Furthermore, the transmission may contain coded information that client computing device 202 may provide as evidence of detecting a signal from cooperating geolocation device 212. Returning to the above-described examples, an SSID broadcast by a wireless access point or a specific pattern of flashes from a smart lightbulb may represent the coded information. Additional examples include digitally signed certificates, secret passcodes, or any other suitable information that may be used as evidence that client computing device 202 detected a genuine transmission from cooperating geolocation device 212.

In further embodiments, cooperating geolocation device 212 may provide evidence that it successfully detected at least one transmission from client computing device 202. For example, validation module 108 may instruct client computing device 202 to provide a secret code to the cooperating geolocation device. Validation module 108 may accept proximity validation check 224 as having successfully completed upon receiving confirmation from cooperating geolocation device 212 that client computing device 202 provided the correct secret code to cooperating geolocation device 212.

Moreover, client computing device 202 and cooperating geolocation device 212 may perform a confirmation handshake communication, and provide evidence of the confirmation handshake to validation module 108 as part of performing proximity validation check 224. For example, cooperating geolocation device 212 may indicate to validation module 108 that it is able to detect an SSID being broadcast by cooperating geolocation device 212. Validation module 108 may then instruct client computing device 202 to transmit a secret code to cooperating geolocation device 212, and cooperating geolocation device 212 may complete proximity validation check 224 by providing validation module 108 with evidence that it received the correct secret code from client computing device 202.

As described above, cooperating geolocation device 212 may be capable of determining its own physical location. In examples where cooperating geolocation device 212 determines its own physical location, it may, during the proximity validation check, determine a set of geolocation coordinates for itself and provide those geolocation coordinates to backend computing system 206. If client computing device 202 reports that it is able to detect such a cooperating geolocation device, but the cooperating geolocation device reports itself to be at a different physical location, then validation module 108 may indicate that client computing device 202 failed the validation check. While any cooperating geolocation device may use this feature, this process of double-checking physical locations may be especially useful for cooperating geolocation devices that are not stationary. For example, a wireless access point attached to a public transit vehicle may not be at the expected location if the public transit vehicle is delayed. If client computing device 202 informs backend computing system 206 that it is able to detect the wireless access point at the public transit vehicle's expected location when the transit vehicle is delayed and the wireless access point reports its physical location as somewhere other than the expected location, validation module 108 may accordingly determine that client computing device 202 has failed the validation check.

In some embodiments, the result of the validation check may include a proximity confidence score that represents a level of confidence that the client computing device is located at the geolocation coordinates. For example, geolocation coordinates successfully and properly validated with a trusted cooperating geolocation device may receive a higher proximity confidence score than geolocation coordinates verified with an untrusted device. In some examples, the proximity confidence score may be based at least in part on the number of cooperating geolocation devices demonstrated to be within physical proximity of the client computing device. In general, it may be more difficult to spoof or otherwise fake contact with a greater number of cooperating geolocation devices. Accordingly, validation checks that successfully validate geolocation coordinates from client computing device 202 with a greater number and/or at least a threshold number of cooperating geolocation devices may award those geolocation coordinates with a proximity confidence score representing a greater level of confidence in the geolocation coordinates being correct.

In some cases, backend computing system 206 may calculate, determine, retrieve, or otherwise be aware of reputation scores assigned to each cooperating geolocation device participating in proximity validation check 224. The reputation score assigned to a given cooperating geolocation device represents a level of trust in the given cooperating geolocation device to accurately perform the proximity validation check. For example, a purpose-built cooperating geolocation device equipped with a TPM that provides digitally signed confirmations during validation checks may be afforded a more trustworthy reputation score than a coffee shop wireless access point. The calculated proximity confidence score may be based at least in part on a combination of reputation scores assigned to each cooperating geolocation device demonstrated to be within physical proximity of client computing device 202. For example, a proximity validation check that uses three highly-trusted devices may yield a more confident proximity confidence score over a proximity validation check that only uses a single moderately-trusted cooperating device.

Figure 5:
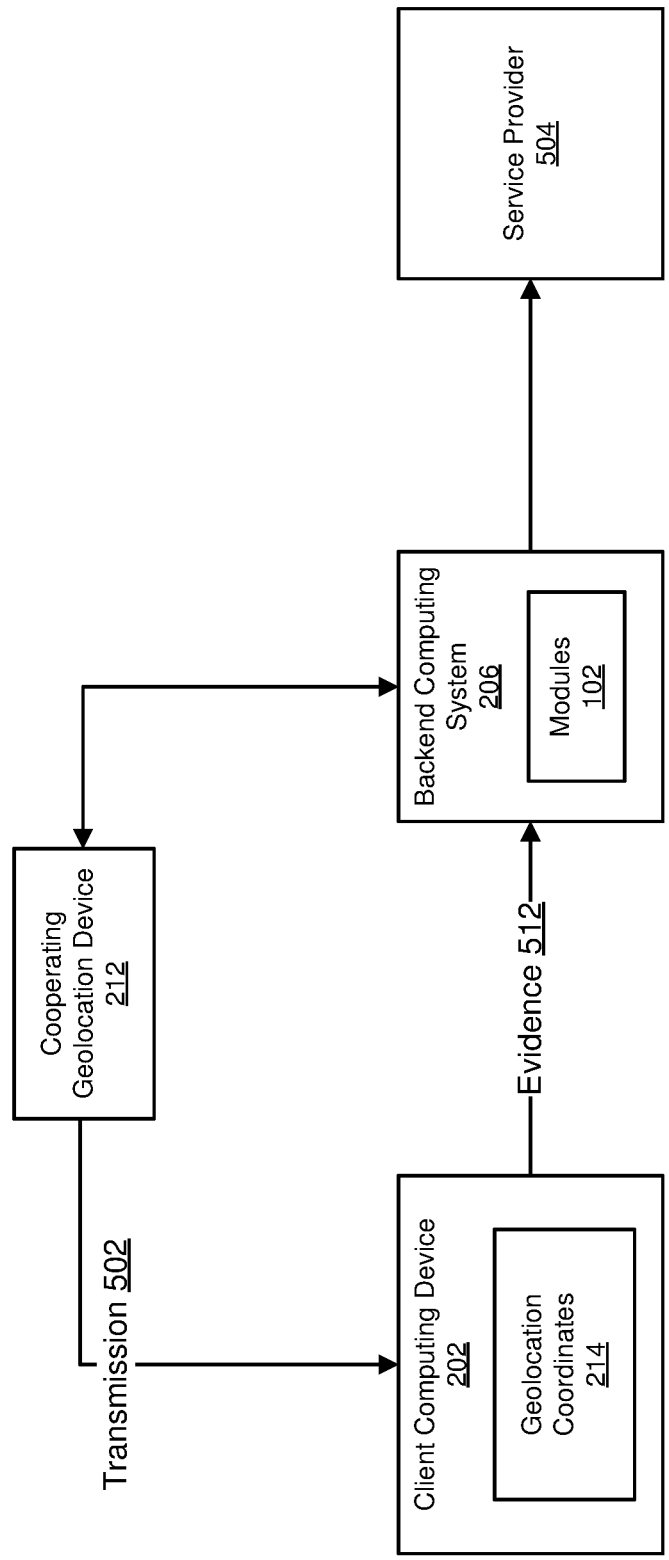
FIG. 5 is a block diagram of an example computing system for performing a proximity validation check.

An illustrated example of a validation check is provided in FIG. 5. As shown in FIG. 5, client computing device 202 may attempt to verify geolocation coordinates 214 via backend computing system 206. As part of this request, client computing device 202 may provide evidence 512 of being able to detect at least one transmission 502 being transmitted by cooperating geolocation device 212. Backend computing system 206 may, as part of a proximity validation check to verify that client computing device 202 and cooperating geolocation device 212 are within physical proximity to each other, instruct cooperating geolocation device 212 to provide a secret code to client computing device 202, and client computing device 202 may provide this secret code to backend computing system 206. Once backend computing system 206 has determined that client computing device 202 has successfully performed the proximity validation check, one or more elements of modules 102 may certify geolocation coordinates 214 as valid and may, as will be described in greater detail below, forward the certified coordinates to a service provider 504.

Returning to FIG. 3 at step 308, one or more of the systems described herein may certify, based on the proximity validation check, the geolocation coordinates as valid geolocation coordinates. For example, certifying module 110 may, as part of backend computing system 206 in FIG. 2, certify, based on the proximity validation check, geolocation coordinates 214 as valid geolocation coordinates.

Certifying module 110 may only certify geolocation coordinates 214 if validation module 108 determines that client computing device 202 has successfully passed proximity validation check 224, as described in greater detail above. If validation module 108 determines that geolocation coordinates 214 are invalid, certifying module 110 may refuse to certify geolocation coordinates 214, report the failure to client device 202, and/or report the failure to a service provider that is the intended recipient of geolocation coordinates 214.

In situations where validation module 108 determines that client computing device 202 successfully passes proximity validation check 224, certifying module 110 may certify geolocation coordinates 214 as valid geolocation coordinates. As part of this certification, certifying module 110 may perform a variety of tasks. For example, certifying module 110 may forward geolocation coordinates 214 to a service provider that trusts backend computing system 206 to validate geolocation coordinates. In some embodiments, certifying module 110 may provide geolocation coordinates 214 as part of a digitally signed message affirming that geolocation coordinates 214 are valid geolocation coordinates. Certifying module 110 may provide this digitally signed message to a service provider and/or to client computing device 202. In embodiments where certifying module 110 provides the digitally signed message to client computing device 202, client computing device 202 may then provide the digitally signed message to service providers as proof that geolocation coordinates 214 are valid geolocation coordinates.

In embodiments where the systems and methods described herein validate geolocation coordinates 214 in response to a request from a service provider, certifying module 110 may simply respond to the service provider with a signal indicating whether geolocation coordinates 214 are valid for client computing device 202. For example, NIANTIC GAMES may request that backend computing system 206 validate geolocation information for a particular device running the POKEMON GO application. In this example, certifying module 110 may respond to the NIANTIC GAMES server that yes, the geolocation information is valid.

In some embodiments, backend computing system 206 may store the validated geolocation coordinates for such a device along with a timestamp. Certifying module 110 may then be able to respond requests to verify the physical location of client computing device 202 without necessarily repeating the proximity validation check for each request. For example, certifying module 110 may provide affirmative responses to any requests to validate a previously validated set of geolocation coordinates within a predetermined window of time after client computing device 202 passes proximity validation check 224 for the provided set of geolocation coordinates. As a specific example, a mobile phone may successfully validate geolocation coordinates indicating that it is physically located at a particular coffee shop. A user of the mobile phone may access several applications while at the coffee shop, each of which may trigger a service provider to request validated geolocation coordinates from client computing device 202 and/or otherwise prompt client computing device 202 to verify the authenticity of its geolocation information. Certifying module 110 may require that validation module 108 successfully perform proximity validation check 224 for the first request before responding that the coordinates are valid, but then automatically respond to further requests within the next five minutes that the coordinates are valid without performing further proximity validation checks.

As described in greater detail above in connection with example method 300 from FIG. 3, a backend computing system may validate geolocation information for client devices based on nearby Internet of Things (IoT) devices. In a typical validation process, the client device may request that the backend computing system verify the physical location of the client device. The backend computing system may then perform any or all of a variety of proximity validation checks to determine whether the client device is within physical proximity to cooperating geolocation devices with known locations, such as beacons, registered wireless hotspots, etc. Once the backend computing system verifies that the client device is within physical proximity of the cooperating geolocation device(s), the backend computing system may designate the geolocation coordinates as valid and/or certified geolocation coordinates.

Figure 6:
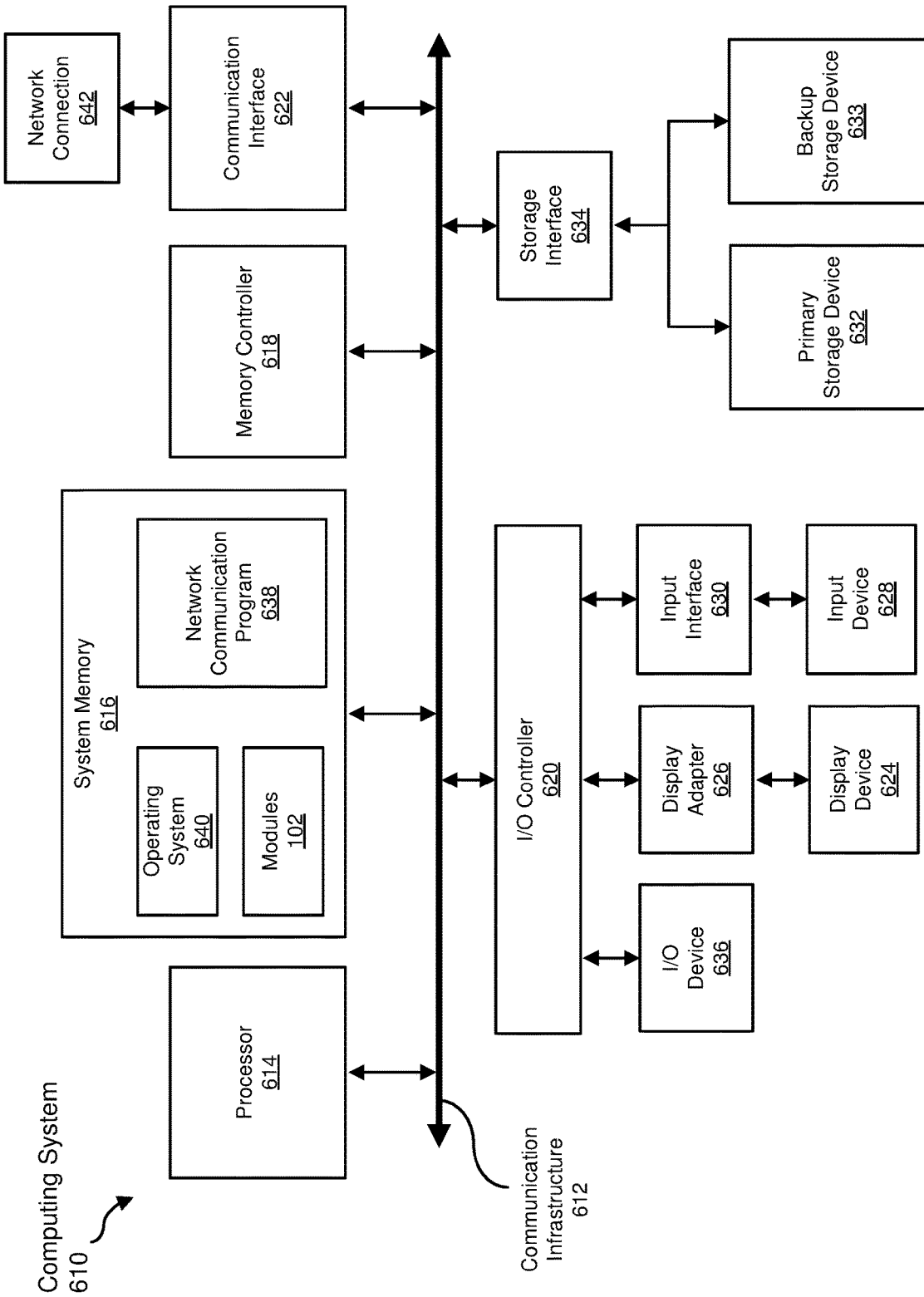
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
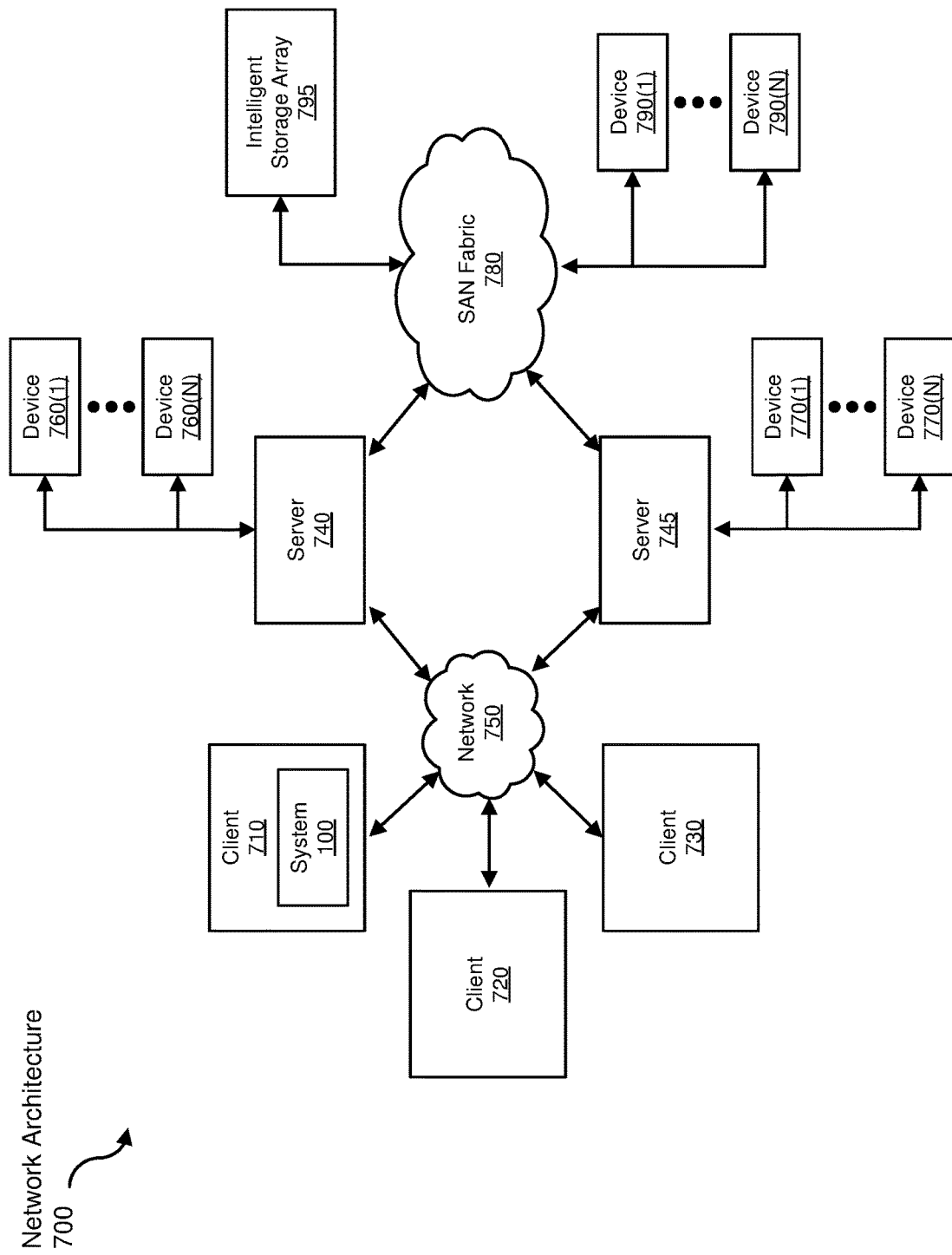
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for certifying geolocation coordinates of computing devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive, from a client device, geolocation coordinates to be transformed, use the geolocation coordinates to identify at least one cooperating geolocation device, perform a validation check to determine whether the geolocation coordinates are valid geolocation coordinates, transform the geolocation coordinates into validated geolocation coordinates, provide a result of the transformation to the client computing device and/or a service provider, and/or output a result of the transformation to a database . . . . Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for certifying geolocation coordinates of computing devices, at least a portion of the method being performed by a backend computing system comprising at least one processor, the method comprising:
    receiving, from a client computing device, a set of geolocation coordinates that purport to identify a physical location of the client computing device;
    identifying, in response to receiving the geolocation coordinates, at least one cooperating geolocation device that is within physical proximity to the geolocation coordinates provided by the client computing device;
    performing a proximity validation check that demonstrates, without exchanging a radio frequency transmission between the client computing device and the cooperating geolocation device that the client computing device is within physical proximity to the at least one cooperating geolocation device, wherein performing the proximity validation check comprises performing a confirmation handshake communication between the client computing device and the at least one cooperating geolocation device comprising at least:
        instructing, by the backend computing system, the cooperating geolocation device to transmit a secret code by flashing a light-spectrum transmission according to a previously-established pattern;
        instructing, by the backend computing system, the client computing device to report the secret code to the at least one cooperating geolocation device as evidence that the client computing device was able to detect the light-spectrum transmission; and
        receiving confirmation from the cooperating geolocation device that the client computing device provided the correct secret code to the cooperating geolocation device; and
    certifying, based on the proximity validation check, the geolocation coordinates as valid geolocation coordinates.

2. The method of claim 1, wherein performing the proximity validation check comprises receiving, from the client computing device, evidence that the client computing device detected at least one transmission from the cooperating geolocation device.

3. The method of claim 2, wherein the transmission comprises at least one of:
    an audio transmission;
    a visible-light spectrum transmission; and
    an infrared-light spectrum transmission.

4. The method of claim 1, wherein performing the proximity validation check comprises receiving confirmation from the cooperating geolocation device that the cooperating geolocation device detected at least one transmission from the client computing device.

5. The method of claim 1, wherein performing the proximity validation check further comprises determining a proximity confidence score that represents a level of confidence that the client computing device is located at the geolocation coordinates.

6. The method of claim 5, wherein the proximity confidence score is based at least in part on the number of cooperating geolocation devices demonstrated to be within physical proximity of the client computing device.

7. The method of claim 5, wherein:
    the proximity confidence score is based at least in part on a combination of reputation scores assigned to each cooperating geolocation device demonstrated to be within physical proximity of the client computing device; and
    the reputation score assigned to a given cooperating geolocation device represents a level of trust in the given cooperating geolocation device to accurately perform the proximity validation check.

8. The method of claim 1, wherein the backend computing system disallows devices that meet predetermined criteria from acting as cooperating geolocation devices, wherein the predetermined criteria disallow at least devices that are frequently found within physical proximity to the client device from acting as cooperating geolocation devices.

9. The method of claim 1, wherein the cooperating geolocation device has a previously established physical location that is known to the backend computing system.

10. The method of claim 1, wherein the cooperating geolocation device:
    determines, during the proximity validation check, a set of cooperating geolocation coordinates for the cooperating geolocation device; and
    provides the cooperating geolocation coordinates to the backend computing system.

11. A backend computing system for certifying geolocation coordinates of computing devices, the system comprising:
    a receiving module, stored in a memory of the system, that receives, from a client computing device, a set of geolocation coordinates that purport to identify a physical location of the client computing device;
    an identification module, stored in the memory, that identifies, in response to receiving the geolocation coordinates, at least one cooperating geolocation device that is within physical proximity to the geolocation coordinates provided by the client computing device;
    a validation module, stored in the memory, that performs a proximity validation check that demonstrates, without exchanging a radio frequency transmission between the client computing device and the cooperating geolocation device, that the client computing device is within physical proximity to the at least one cooperating geolocation device, wherein performing the proximity validation check comprises performing a confirmation handshake communication between the client computing device and the at least one cooperating geolocation device comprising at least:
        instructing, by the backend computing system, the cooperating geolocation device to transmit a secret code by flashing a light-spectrum transmission according to a previously-established pattern;

instructing, by the backend computing system, the client computing device to provide the secret code to the at least one cooperating geolocation device as evidence that the client computing device was able to detect the light-spectrum transmission; and receiving confirmation from the cooperating geolocation device that the client computing device provided the correct secret code to the cooperating geolocation device;

a certifying module, stored in the memory, that certifies, based on the proximity validation check, the geolocation coordinates as valid geolocation coordinates; and at least one physical processor configured to execute the receiving module, the identification module, the validation module, and the certifying module.

12. The system of claim 11, wherein the validation module performs the proximity validation check by receiving, from the client computing device, evidence that the client computing device detected at least one transmission from the cooperating geolocation device.

13. The system of claim 12, wherein the transmission comprises at least one of:
   an audio transmission;
   a visible-light spectrum transmission; and
   an infrared-light spectrum transmission.

14. The system of claim 11, wherein the validation module performs the proximity validation check by receiving confirmation from the cooperating geolocation device that the cooperating geolocation device detected at least one transmission from the client computing device.

15. The system of claim 11, wherein the validation module performs the proximity validation check at least in part by determining a proximity confidence score that represents a level of confidence that the client computing device is located at the geolocation coordinates.

16. The system of claim 15, wherein the proximity confidence score is based at least in part on the number of cooperating geolocation devices demonstrated to be within physical proximity of the client computing device.

17. The system of claim 15, wherein:
   the proximity confidence score is based at least in part on a combination of reputation scores assigned to each cooperating geolocation device demonstrated to be within physical proximity of the client computing device; and
   the reputation score assigned to a given cooperating geolocation device represents a level of trust in the given cooperating geolocation device to accurately perform the proximity validation check.

18. The system of claim 11, wherein the cooperating geolocation device has a previously established physical location that is known to the backend computing system.

19. The system of claim 11, wherein the cooperating geolocation device:
   determines, during the proximity validation check, a set of cooperating geolocation coordinates for the cooperating geolocation device; and
   provides the cooperating geolocation coordinates to the backend computing system.

20. A non-transitory computer-readable medium comprising one or more computer-readable instructions that, when executed by at least one processor of a backend computing system, cause the computing system to:
   receive, from a client computing device, a set of geolocation coordinates that purport to identify a physical location of the client computing device;
   identify, in response to receiving the geolocation coordinates, at least one cooperating geolocation device that is within physical proximity to the geolocation coordinates provided by the client computing device;
   perform a proximity validation check that demonstrates, without exchanging a radio frequency transmission between the client computing device and the cooperating geolocation device, that the client computing device is within physical proximity to the at least one cooperating geolocation device, wherein performing the proximity validation check comprises performing a confirmation handshake communication between the client computing device and the at least one cooperating geolocation device comprising at least:
      instructing by the backend comprising system, the cooperating geolocation device to transmit a secret code by flashing a light-spectrum transmission according to a previously-established pattern;
      instructing, by the backend computing system, the client computing device to report the secret code to the at least one cooperating geolocation devices as evidence that the computing device was able to detect the light-spectrum transmission; and
      receiving confirmation from the cooperating geolocation device that the client computing device provided the correct secret code to the cooperating geolocation device; and
   certify, based on the proximity validation check, the geolocation coordinates as valid geolocation coordinates.

* * * * *